United States Patent
Agombar et al.

(10) Patent No.: US 8,645,646 B2
(45) Date of Patent: Feb. 4, 2014

(54) STORED DATA PROTECTION AND RECOVERY

(75) Inventors: John P. Agombar, Hampshire (GB); Christopher B. Beeken, Hampshire (GB); Carlos F. Fuente, Southampton (GB); Simon Walsh, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 12/525,433

(22) PCT Filed: Jan. 10, 2008

(86) PCT No.: PCT/EP2008/050242
§ 371 (c)(1),
(2), (4) Date: Feb. 2, 2010

(87) PCT Pub. No.: WO2008/092721
PCT Pub. Date: Aug. 7, 2008

(65) Prior Publication Data
US 2010/0146204 A1    Jun. 10, 2010

(30) Foreign Application Priority Data
Jan. 31, 2007   (EP) .................................. 07101498

(51) Int. Cl.
*G06F 13/00* (2006.01)
*G06F 13/28* (2006.01)
*G06F 9/26* (2006.01)
*G06F 9/34* (2006.01)

(52) U.S. Cl.
USPC .... 711/162; 711/112; 711/203; 711/E12.016; 711/E12.103

(58) Field of Classification Search
None
See application file for complete search history.

(56) References Cited

U.S. PATENT DOCUMENTS

| 6,557,089 B1 * | 4/2003 | Reed et al. ........... 711/162 |
| 2002/0156987 A1 | 10/2002 | Gajjar et al. |

(Continued)

FOREIGN PATENT DOCUMENTS

| JP | 2005352825 A | 12/2005 |
| JP | 2006301499 A | 11/2006 |

OTHER PUBLICATIONS

Office Action dated Mar. 6, 2012, no translation available, Application No. JP2009-547621, 3 pages.

(Continued)

*Primary Examiner* — Reginald Bragdon
*Assistant Examiner* — Eric S Cardwell
(74) *Attorney, Agent, or Firm* — Francis Lammis; Stephen J. Walder, Jr.; Randall J. Bluestone

(57) ABSTRACT

A mechanism is provided in a computing system for controlling virtualized storage operable to communicate with a host and with mapped and unmapped storage resource pools. A selection component selects a target for a destructive data storage operation from the mapped storage resource pool. Responsive to the selection of the target, a virtual targeting component creates a virtual target from the unmapped storage resource pool to represent the target. Responsive to the selection of the target, a storage move component moves the target to a protected storage resource pool. Responsive to the creation of the virtual target from the unmapped storage resource pool, storage move component, moves the virtual target to the used storage resource pool. The computing system then performs the destructive data storage operation on the virtual target.

15 Claims, 3 Drawing Sheets

(56) References Cited

U.S. PATENT DOCUMENTS

| | | |
|---|---|---|
| 2003/0188114 A1 | 10/2003 | Lubbers et al. |
| 2004/0117585 A1 | 6/2004 | Glider |
| 2004/0177130 A1 | 9/2004 | Chambliss et al. |
| 2005/0228945 A1 | 10/2005 | Nagata |
| 2006/0101204 A1 | 5/2006 | Bao |
| 2006/0184650 A1 | 8/2006 | Abali et al. |
| 2006/0224844 A1 | 10/2006 | Kano et al. |
| 2006/0230074 A1 | 10/2006 | Everhart et al. |
| 2008/0184063 A1* | 7/2008 | Abdulvahid .................. 714/6 |

OTHER PUBLICATIONS

Written Opinion of the International Searching Authority, PCT/ISA/237, Application No. PCT/EP2008/050242, Apr. 16, 2008, 7 pages.

European Patent Office Communication pursuant to Article 94(3) EPC including Form 2906, Oct. 28, 2009, 3 pages.

\* cited by examiner

STORED DATA PROTECTION AND RECOVERY

BACKGROUND

The present invention relates to a technology for controlling storage systems, and in particular to a technology for controlling storage systems having storage virtualization capabilities and advanced storage functions, such as Flash-Copy® and Remote Copy.

The administration of a large storage system is a complicated task. An administrator may have control of many thousands of storage devices and it is easy to make a mistake and accidentally select the wrong device when performing a task. For some tasks selecting the wrong device can be disastrous—for example selecting the wrong device as a target for a FlashCopy® (FlashCopy is a registered trademark of International Business Machines Corporation in the United States and in other countries) or Remote Copy task. These tasks, among others, can be characterized as "destructive" tasks.

Once a destructive task has started, the data on the target device is lost and, without a backup, recovery may not be possible. Even with a backup, recovery takes a significant time to complete when, for example, the backup is held on tape and all transactions completed since the last backup need to be replayed before the data is available again.

It would thus be desirable to have a technology for controlling advanced storage systems when human error puts data at risk of loss, and in particular to have a technological means for protecting and recovering data after such an error has occurred.

SUMMARY

In one illustrative embodiment, a mechanism is provided for controlling virtualized storage operable to communicate with a host and with mapped and unmapped storage resource pools. The illustrative embodiment selects a target from the mapped storage resource pool for a destructive data storage operation. The illustrative embodiment creates a virtual target from the unmapped storage resource pool to represent the target in response to the selection of the target from the mapped storage resource pool. The illustrative embodiment moves the target to a protected storage resource pool in response to the selection of the target from the mapped storage resource pool. The illustrative embodiment moves the virtual target to the mapped storage resource pool in response to the creation of the virtual target from the unmapped storage resource pool. The illustrative embodiment then performs the destructive data storage operation on the virtual target.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

A preferred embodiment of the present invention will now be described, by way of example only, with reference to the accompanying drawing figures, in which.

DETAILED DESCRIPTION

The illustrative embodiments are implemented in a storage system in which storage may be virtualized, and in which advanced storage functions, such as FlashCopy® and Remote Copy, are implemented.

Figure 1:
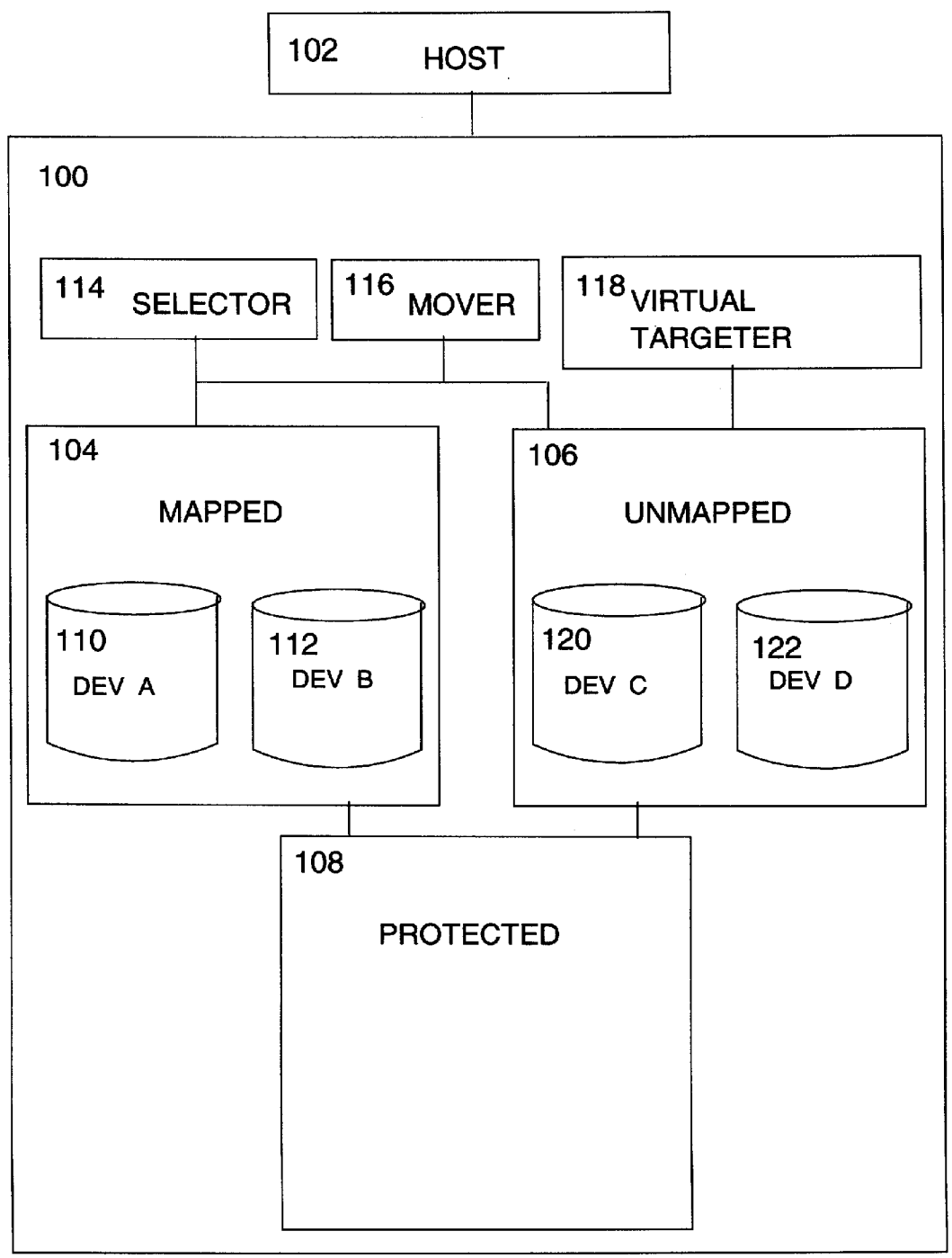
FIG. 1 shows in schematic form an arrangement of apparatus in accordance with a preferred embodiment of the present invention in a first state.

Turning to FIG. 1, which shows an apparatus in accordance with a preferred embodiment of the illustrative embodiments, there is shown an apparatus or arrangement 100 of components operable in communication with a host 102.

The apparatus or arrangement 100 comprises a selector component 114, a mover component 116 (more than one mover component may be provided, but only one is shown, for simplicity), and a virtual targeter component 118. The apparatus or arrangement 100 further comprises three pools: mapped pool 104 comprises exemplary device A 110 and device B 112; unmapped pool 106 comprises exemplary device C 120 and device D 122; and protected pool 108, in the first state of the apparatus, comprises no devices.

Selector component 114 is responsive to a user selection received via the host 102 to select a device to act as a target for a destructive operation (as defined above). In the present example, device B 112 has been incorrectly selected to act as the target, as it is already mapped and in use, and were it allowed to become the target, the data already on it would be lost.

Figure 2:
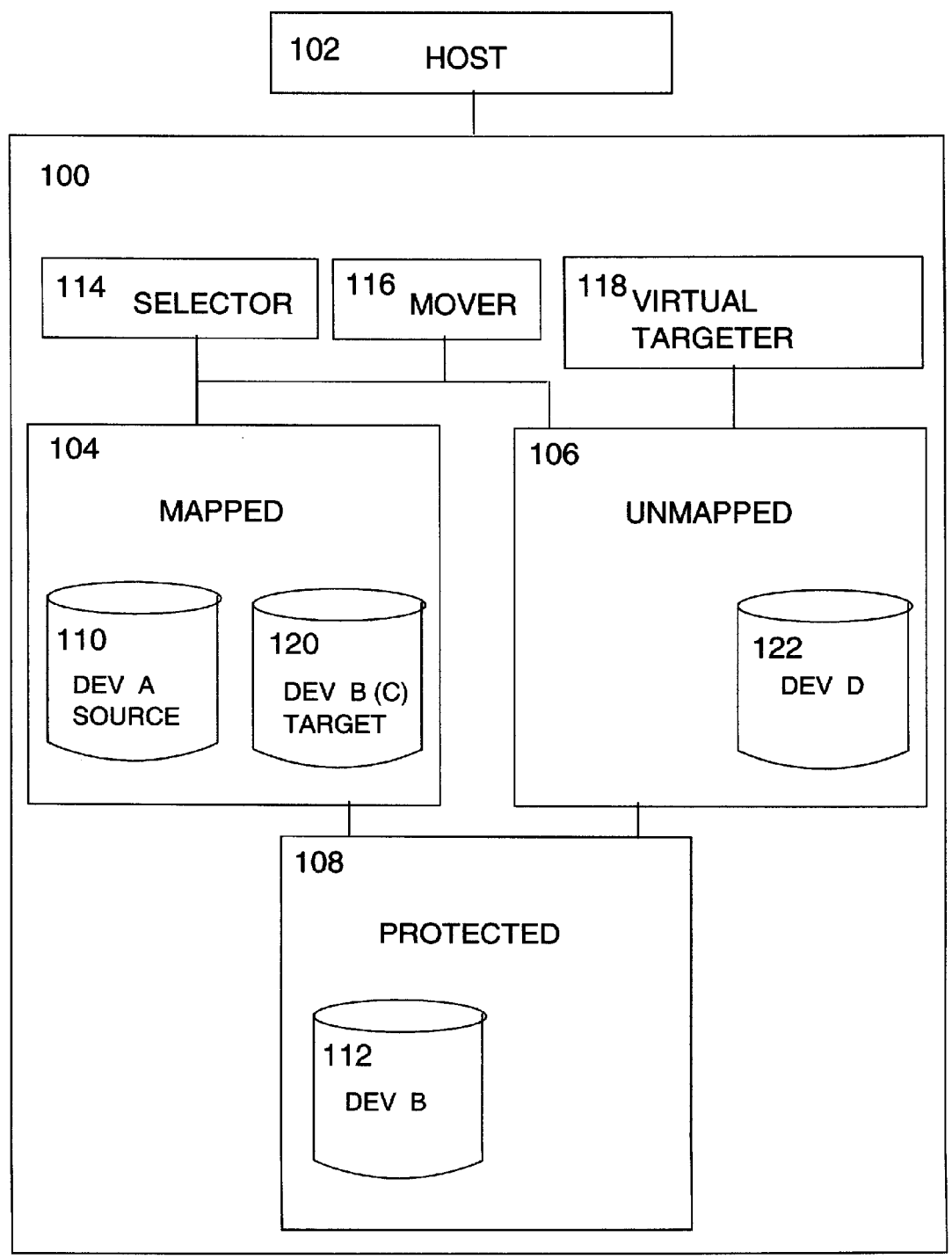
FIG. 2 shows in schematic form an arrangement of apparatus in accordance with a preferred embodiment of the present invention in a second state.

Thus, as shown in the state of FIG. 2 in accordance with an illustrative embodiment, mover component 116 moves the selected device B 112 from the mapped pool 104 to the protected pool 108, virtual targeter component 118 creates a virtual device B using device C 120 from unmapped pool 106, and mover component 116 moves the device C 120 from the unmapped pool 106 to the mapped pool 104.

The data contents of device B 112 are now protected and will not be lost during the destructive operation. If at some point, the systems administrator realises the error, device B 112 can be reinstated into the mapped pool 104 and its use resumed.

In FIG. 1, therefore, there are three resource pools containing resources to be treated in different ways by the system, thus:

| | |
|---|---|
| Mapped Resource Pool 104: | The virtualised device resources that are mapped to a host. |
| Unmapped Resource Pool 106: | All the resources that can be used to construct new virtualised devices. |
| Protected resource Pool 108: | All those resources that are not mapped to a host and that must not be used to construct new virtualised devices. |

In FIG. 1, host 102 has a mapping of two virtualised devices, device A 110 and device B 112, which reside in the mapped resource pool 104. There are also enough resources in the unmapped resource pool 106 to construct further devices.

In FIG. 2, a new mapping for a FlashCopy® relationship (or some other destructive relationship) has been started from device A 100 to device B 112. As a result, device B 112 has been moved to the protected storage pool 108 so that none of its resources can be reused. Device C 120 has been constructed from the unmapped resource pool 106 and is used to replace device B 112 as the target of the destructive relationship.

If, after starting the new mapping, the administrator discovers a mistake has been made, the system can be recovered to the point prior to the start of the FlashCopy® by stopping the FlashCopy® and returning device B 112 to replace virtual device B(device C) 120 in the mapped resource pool 104. Virtual device B(device C) 120 can then be returned to the unmapped resource pool 106.

It will be clear to one of ordinary skill in the art that the same technique could be used for Remote Copy relationships, or for any other relationship in which the data on an incorrectly-selected device could be lost.

The preferred embodiment of the present invention in the form of an apparatus or arrangement of apparatus thus advantageously addresses the problem of providing a technology for controlling advanced storage systems when human error puts data at risk of loss, and in particular a technology for protecting and recovering data after such an error has occurred.

Figure 3:
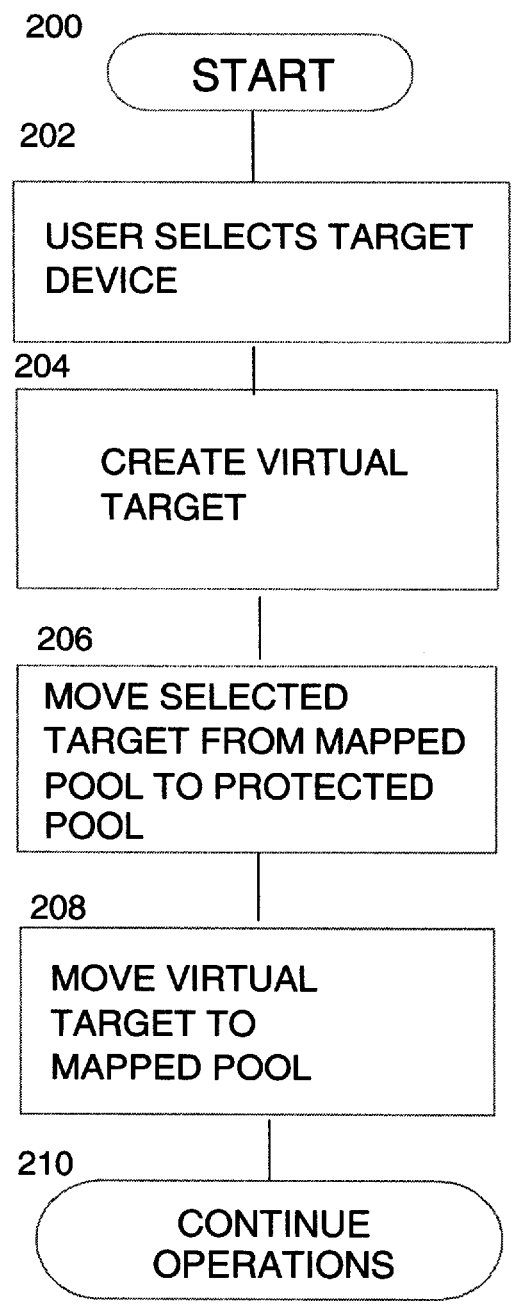
FIG. 3 shows in flowchart form one method or one logic arrangement in which a method of operation according to a preferred embodiment of the present invention may be implemented.

Turning now to FIG. 3, there are shown in flowchart form the steps of a method or logic arrangement according to a preferred embodiment of the illustrative embodiments.

In FIG. 3, the method or logic arrangement includes steps beginning at START step 200. A user selects a target device at step 202. At step 204, a virtual target is created, and at step 206, the selected target is moved from the mapped pool 104 to the protected pool 108. At step 208, the virtual target is moved from the unmapped pool 106 to the mapped pool 104, and at step 210, operations continue.

It will be clear to one of ordinary skill in the art that the sequence of operations of FIG. 3 and the above description may be modified in certain circumstances, such that, for example, the moving operations and the creation of the virtual target may be arranged in a different sequence, or that certain operations may be carried out in parallel.

The preferred embodiment of the present invention, in the form of a method or logic arrangement, thus advantageously addresses the problem of providing a technology for controlling advanced storage systems when human error puts data at risk of loss, and in particular a technology for protecting and recovering data after such an error has occurred.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause said computer infrastructure to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. An apparatus for virtualized storage control, operable in communication with a host and having mapped and unmapped storage resource pools, and comprising:
   a processor, and
   a memory coupled to the processor, wherein the memory comprises instructions which, when executed by the processor, cause the processor to:
   select a target device from the mapped storage resource pool for a destructive data storage operation;
   responsive to the selection of the target device from the mapped storage resource pool, create a virtual target device from the unmapped storage resource pool to represent the target device;
   responsive to the selection of the target device from the mapped storage resource pool, move the target device to a protected storage resource pool thereby removing the target device from the mapped storage pool;
   responsive to the creation of the virtual target device from the unmapped storage resource pool, move the virtual target device to the mapped storage resource pool thereby replacing the target device; and
   perform the destructive data storage operation on the virtual target device rather than the target device.

2. The apparatus as claimed in claim 1, wherein the mapped storage resource pool, the unmapped storage resource pool, and the protected storage resource pool comprise disk storage devices.

3. The apparatus as claimed in claim 1, wherein, in response to a cancelation of the destructive data storage operation, the virtual target device is moved to the unmapped storage resource pool and the target device is retrieved from the protected storage resource pool to the mapped storage resource pool.

4. The apparatus as claimed in claim 1, wherein the destructive data storage operation comprises a copy operation.

5. The apparatus as claimed in claim 1, wherein the destructive data storage operation comprises a Remote Copy operation.

6. A method, in a computer system, for controlling virtualized storage operable to communicate with a host and with mapped and unmapped storage resource pools, the method comprising:
   selecting, by a selection component, a target device for a destructive data storage operation from the mapped storage resource pool;
   responsive to the selection of the target device, creating, by a virtual targeting component, a virtual target device from the unmapped storage resource pool to represent the target device;
   responsive to the selection of the target device, moving, by a storage move component, the target device to a protected storage resource pool thereby removing the target device from the mapped storage pool;
   responsive to the creation of the virtual target device from the unmapped storage resource pool, moving, by the storage move component, the virtual target device to the used storage resource pool thereby replacing the target device; and
   performing, by the computing system, the destructive data storage operation on the virtual target device rather than the target device.

7. The method as claimed in claim 6, wherein the mapped storage resource pool, the unmapped storage resource pool, and the protected storage resource pool comprise disk storage devices.

8. The method as claimed in claim 6, wherein, in response to a cancelation of the destructive data storage operation, the virtual target device is moved to the unmapped storage resource pool and the target device is retrieved from the protected storage resource pool to the mapped storage resource pool.

9. The method as claimed in claim 6, wherein the destructive data storage operation comprises a copy operation.

10. The method as claimed in claim 6, wherein the destructive data storage operation comprises a Remote Copy operation.

11. A computer program product comprising a non-transitory machine-readable storage medium having a computer readable program recorded thereon, wherein the computer readable program, when executed on a computing device, causes the computing device to:
    select a target device from the mapped storage resource pool for a destructive data storage operation;
    responsive to the selection of the target device from the mapped storage resource pool, create a virtual target device from the unmapped storage resource pool to represent the target device;
    responsive to the selection of the target device from the mapped storage resource pool, move the target device to a protected storage resource pool thereby removing the target device from the mapped storage pool;
    responsive to the creation of the virtual target device from the unmapped storage resource pool, move the virtual target device to the mapped storage resource pool thereby replacing the target device; and
    perform the destructive data storage operation on the virtual target device rather than the target device.

12. The computer program product as claimed in claim 11, wherein the mapped storage resource pool, the unmapped storage resource pool, and the protected storage resource pool comprise disk storage devices.

13. The computer program product as claimed in claim 11, wherein, in response to a cancelation of the destructive data storage operation, the virtual target device is moved to the unmapped storage resource pool and the target device is retrieved from the protected storage resource pool to the mapped storage resource pool.

14. The computer program product as claimed in claim 11, wherein the destructive data storage operation comprises a copy operation.

15. The computer program product as claimed in claim 11, wherein the destructive data storage operation comprises a Remote Copy operation.

* * * * *